United States Patent [11] 3,608,927

| [72] | Inventor | Albert Grosseau<br>Chaville, France |
|---|---|---|
| [21] | Appl. No. | 887,081 |
| [22] | Filed | Dec. 22, 1969 |
| [45] | Patented | Sept. 28, 1971 |
| [73] | Assignee | Societe Anonyme Automibiles Citroen<br>Paris, France |
| [32] | Priority | Dec. 27, 1968 |
| [33] | | France |
| [31] | | 181,255 |

[54] LONGITUDINAL-FLEXIBILITY WHEEL SUSPENSION
10 Claims, 16 Drawing Figs.

[52] U.S. Cl. .................................................. 280/124,
 308/238
[51] Int. Cl. ..................................................... B60g 3/12
[50] Field of Search .......................................... 280/124;
 308/238

[56] References Cited
UNITED STATES PATENTS

| 3,133,769 | 5/1964 | Drake | 308/238 X |
|---|---|---|---|
| 3,298,762 | 1/1967 | Peck | 308/238 |
| 3,437,348 | 4/1969 | Henry-Biabaud | 280/124 |

*Primary Examiner*—Philip Goodman
*Attorneys*—Robert E. Burns and Emmanuel J. Lobato ABSTRACT: Longitudinal-flexibility suspension system for vehicle wheels comprising an arm adapted to oscillate about a fixed shaft disposed in a vertical longitudinal plane and rigid with the chassis of the vehicle, a first sleeve of elastomer mounted about said shaft and having a cylindrical outer surface formed with hollow cells spaced from one another and from the sleeve ends, said outer surface of the sleeve being in frictional contact with the inner surface of a first end of a hub while a second connecting means consists of a second sleeve of elastomer fitted on said shaft and formed with circular external projections in frictional contact with the inner surface of the other end of said hub.

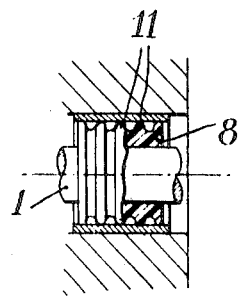
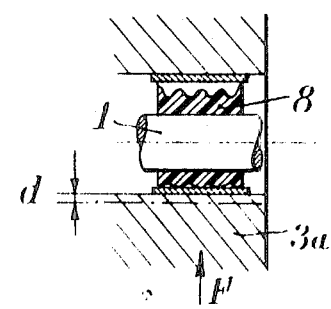
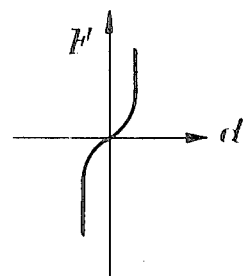
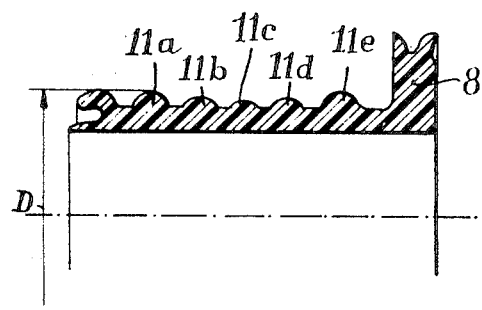

3,608,927

LONGITUDINAL-FLEXIBILITY WHEEL SUSPENSION

BACKGROUND OF THE INVENTION

The present invention relates to longitudinal-flexibility suspension systems for vehicle wheels.

A wheel suspension of this general type is already known wherein the wheel support or stub axle is mounted to the outer end of a transverse wheel carrier arm provided at its inner or mounting end with a relatively large hub whereby said arm is adapted to oscillate about a fixed shaft disposed in a vertical longitudinal plane and rigid with the chassis of the vehicle; in this suspension one end of the aforesaid hub is provided with a first inner means for flexibly connecting same to the shaft while preventing any radial movement of the hub axis but permitting its inclination in relation to the shaft by oscillating about a center located close to the point of intersection of said shaft axis with the transverse plane containing the axis of the pivotal movements of said arm in relation to the wheel support, the other end of the hub being provided with another connecting means with said shaft for damping out the radial beats or movements of this other hub end in relation to said shaft.

SUMMARY OF THE INVENTION

It is the object of the present invention to provide a longitudinal-flexibility suspension of the general type set forth hereinabove which is constructionally simple, adapted to filter out noise generated during the operation of the vehicle and the vibrations likely to be transmitted by said arm, and wherein the design of the second connecting means can be easily be adapted to the desired progressivity characteristic of the return force urging the other end of the hub to its concentric position in relation to said shaft.

To this end, the first connecting means consists of a first sleeve of elastomer mounted about said shaft and having a cylindrical outer surface formed with hollow cells spaced from one another and from the sleeve ends, said outer surface of the sleeve being in frictional contact with the inner surface of a first end of said hub while said second connecting means consists of a second sleeve of elastomer fitted on said shaft and formed with circular external projections in frictional contact with the inner surface of the other end of said hub.

According to a specific form of embodiment of this invention said transverse circular projections provided on the outer surface of said second sleeve have an outer diameter decreasing gradually in the direction away from the center of oscillation of the hub in relation to the longitudinal carrier shaft.

With this specific form of embodiment of the second sleeve the contact pressures are uniformly distributed along a generatrix of said sleeve, thus increasing very appreciably the useful life of the assembly.

On the other hand, the suspension flexibility is improved in the case of low-amplitude beats, thus providing a substantial improvement in the quality of this elastic connection from the dual point of view of noise and vibration.

According to a modified form of embodiment the radii of curvature of the meridians of the circular projections formed on said second sleeve decrease gradually in the direction away from the center of oscillation of the hub in relation to the longitudinal carrier shaft.

BRIEF DESCRIPTION OF THE DRAWING

The features and advantages characterizing this invention will appear more completely as the following description proceeds with reference to the attached drawing given by way of illustration but not of limitation:

FIGS. 6a and 6b are diagrammatic axial sections showing in the same fashion the mode of operation of the second sleeve;

FIG. 7 is a diagram plotting the return force exerted by the second sleeve when the axis of the other end of the sleeve is shifted radially by a distance $d$ from the shaft axis;

FIG. 8 is an axial half-view showing a modified form of embodiment of the second sleeve;

FIG. 9 is a fragmentary longitudinal section showing another form of embodiment of the second sleeve;

DESCRIPTION OF THE PREFERRED EMBODIMENTS

Figure 1:
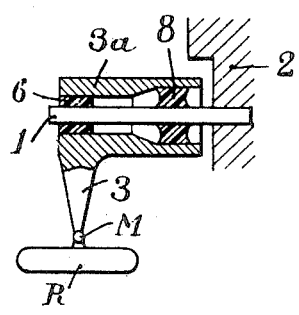
FIG. 1 is a diagrammatic horizontal section illustrating the principle of the wheel suspension according to this invention.

In the wheel suspension system according to this invention, a wheel R shown in FIG. 1 is carried, with the interposition of a pivotal mounting, by the outer end M of carrier arm 3 rotatably mounted through its hub $3a$ to a fixed shaft 1 lying in a vertical longitudinal plane and rigid with the chassis 2 of the vehicle. Also mounted on this shaft 1 is a pair of sleeves, namely a first sleeve 6 engaging the front end of hub $3a$ and a second sleeve 8 inserted in the rear end of this hub.

The configuration of the front sleeve 6 consisting of suitable elastomer is calculated with a view to prevent radial movements of the front end of hub $3a$ in relation to the shaft 1 while permitting slight oscillations of this hub in relation to a fixed point C of the axis of shaft 1 which lies approximately in the transverse plane containing the end M of arm 3.

The second of rear sleeve 8 also made of suitable elastomer is shaped with a view to exert a radial return force upon the rear end of the axis of hub $3a$ when this end tends to become eccentric in relation to the axis of shaft 1. As a result, the wheel R can beat in the longitudinal direction in which it may be urged by vibration generated by road unevennesses without moving transversely and thus interfere with the directional stability of the vehicle.

Figure 2:
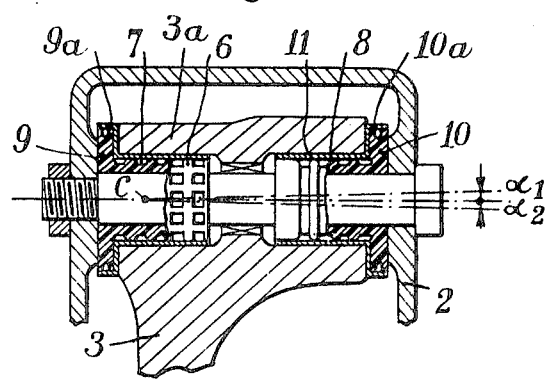
FIG. 2 is an axial section showing on a larger scale a first form of embodiment of the mounting of the hub of the wheel carrier arm on the longitudinal shaft.
Figure 3:
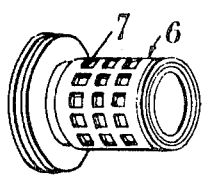
FIG. 3 is a perspective view showing the first sleeve.
Figure 4:
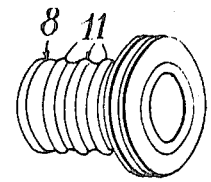
FIG. 4 is a perspective view showing the second sleeve.

FIG. 2 shows another form of embodiment of the basic principle of the present invention which is shown diagrammatically in FIG. 1. In this construction the front sleeve 6, as specially illustrated in FIG. 3, comprises a perfectly cylindrical outer surface in which properly spaced hollow cells 7 are formed, the relative spacing of these cells providing therebetween a frictional contact surface continuously engaging the inner surface of the front end of hub $3a$. These cells 7 are adapted to be filled with grease to counteract any local crushing action to which the sleeve 6 may be exposed notably when the end M of arm 3 is subjected to longitudinal stresses. The rear sleeve 8, as shown more particularly in FIG. 4, has an outer surface formed with circular projections 11 of which at least one fraction engages the inner surface of the rear end of hub $3a$ in the inoperative position, i.e. when no stress is exerted on the end M of arm 3. The grooves formed between these adjacent circular projections are also filled with grease but the latter does not counteract or prevent a localized crushing of said sleeve 8 since this grease can flow circumferentially about the sleeve.

Figure 5A:
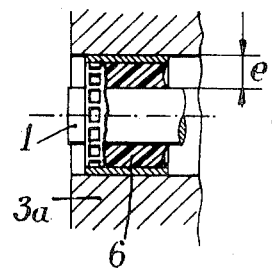
FIGS. 5a, 5b and 5c are diagrammatic axial sections showing the mode of operation of the first sleeve.
Figure 5B:
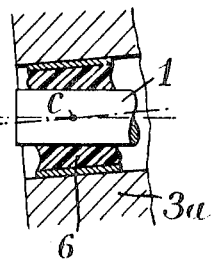
Figure 5C:
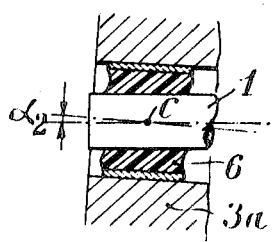

The front sleeve 6 prevents any radial movements or beats of the front end of hub $3a$ in relation to the corresponding end of shaft 1, the peripheral gap between this hub portion and the shaft being kept at the same mean value $e$ as in its inoperative position (FIG. 5a) when torsion stresses in either direction are exerted on shaft 3. If an effort is exerted in the rearward or forward direction against the end M of arm 3, the latter will be deflected by an angle $\alpha_1$ in one direction and by an angle $\alpha_2$ in the opposite direction, about the point C, as clearly shown in FIGS. 5b and 5c, respectively.

Under the influence of the pivotal movements of hub 3a about this point C the rear end of this hub, in relation to the corresponding portion of shaft 1 and under the influence of the force F corresponding to an effort exerted on arm 3, will be deflected radially to an extent d, shown in FIG. 6b, in relation to the inoperative position shown in FIG. 6a.

The circular projections 11 of the rear sleeve 8 may be shaped with a view to obtain any desired progressiveness in the radial flexibility of the coupling system, as determined by means of a diagram of the type illustrated in FIG. 7. In the contour shown in FIG. 8 the circular projections consist of beads 11a to 11e having unequal maximum diameters whereby only the beads having the major diameter exert an appreciable resistance against low-amplitude deflections. In the example illustrated the maximum outer diameters D of the sleeve beads increase from the central bead 11c towards the end beads 11a and 11e. It is also possible to provide each projection with a sharp-edged contour such as 11f (FIG. 9) giving a very low return force in case of low-amplitude beat or deflection, this force increasing rapidly with the amplitude of the beat or deflection.

Friction rings 9a, 10a may be interposed between the sleeves 6 and 8, on the one hand, and the registering hub surfaces, on the other hand.

The axial setting of the wheel carrier arm 3 in relation to the fixed shaft 1 is provided for by causing the ends of hub 3a to abut against bearing surfaces rigid with the vehicle chassis 2, with the interposition of friction members 9, 10 forming if desired an integral part of the pair of sleeves 6 and 8. The annular gap left between the shaft 1 and hub 3a may be rendered fluidtight by the ends of rings 9a and 10a.

Figure 10:
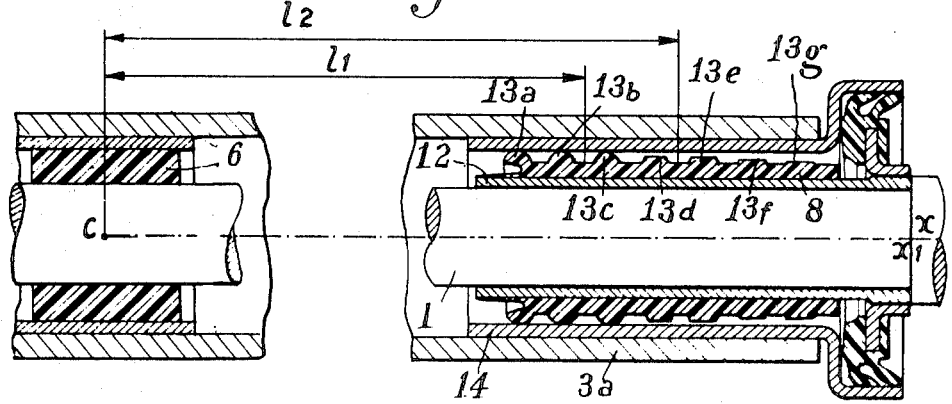
FIG. 10 is an axial section showing another form of embodiment of the second sleeve of the longitudinal-flexibility suspension, this sleeve being shown in its inoperative position, the outer hub of the radial arm being unstressed in longitudinal direction.
Figure 11:
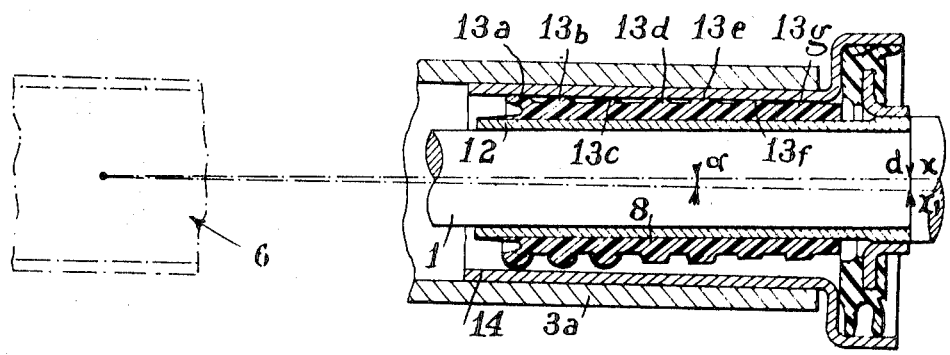
FIG. 11 is another similar axial section showing the sleeve and the hub of the radial arm when the latter is stressed longitudinally.

In the modified form of embodiment illustrated in FIGS. 10 and 11 the outer periphery of sleeve 8 is formed with a plurality of circular transverse beads 13a, 13b, 13c, 13d, 13 e, 13f and 13g of which the outer diameter decreases in the direction away from the center of oscillation C. In other words, the endmost bead 13a at the front end, which is formed with an annular lip also acting as a seal, has the major diameter and the diameters of the next beads decrease gradually.

It may be considered, that, roughly, the geometrical envelope of the contact surfaces of the successive beads 13a to 13 g has a substantially frustoconical configuration with the major base nearer to the oscillation center C than the minor base.

In fact, in the exemplary form of embodiment illustrated in FIGS. 10 and 11 the pair of beads 13b and 13c adjacent to the sealing lip 13a has a meridian in the form of a circular arc and a same outer diameter, equal to or slightly smaller than the inner diameter of an external socket 14 containing the sleeve 8 and housed within the hub 3a.

The next pair of beads 13d, 13e has the same outer diameter but this diameter is slightly smaller than that of beads 13b and 13c. The meridian of beads 13d and 13e consists of a circular arc truncated by a longitudinal chord.

Finally, the beads 13f and 13g have a meridian similar to that of beads 13d and 13c, but their outer diameters are decreasing gradually.

When a longitudinal effort is exerted against the radial arm rigid with the hub 3a in either direction the axis $Cx_1$ of hub 3a is inclined in one or the other direction by an angle $\alpha$ in relation to the axis Cx of the carrier shaft. In this case, due to the gradual decrease in diameter of the successive beads 13b, 13g, the contact pressures are shared out uniformly along a generatrix, thus increasing considerably the useful life of sleeve 8.

On the other hand the flexibility is increased in the case of minor deflections. In fact, in the case of low-amplitude beat or deflection corresponding to small values of the above-defined angle $\alpha$, the return effort is exerted with the minimum lever arm $l_1$, this lever arm being equal to the distance between the oscillation center C and the meridian plane of the pair of beads 13b and 13c. This lever arm increases as the deflection of the suspension arm increases; in other words, in this case the angle $\alpha$ increases to assume successive values $l_1$, $l_2$, etc. The lever arms $l_1$, $l_2$ etc. correspond to the distance between the center of oscillation C and the point of application of the resultant of the return efforts produced by the different beads in operative engagement or contact.

Figure 12:
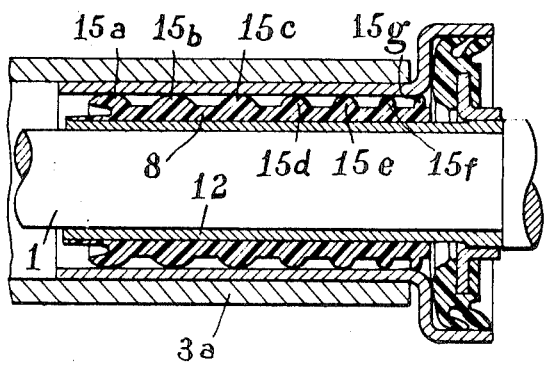
FIG. 12 is an axial section showing a modified form of embodiment of this sleeve.

In the modified form of embodiment illustrated in FIG. 12, the sleeve 8 has formed on its outer periphery a series of beads 15a, 15b, 15c, 15d, 15e, 15f and 15g having the same outer diameter but their meridians have radii of curvature decreasing in the direction away from the center of oscillation C. This particular arrangement of sleeve 8 is attended by a decreased flexibility for low-amplitude beats in relation to the above-described forms of embodiment of this specific sleeve.

Figure 13:
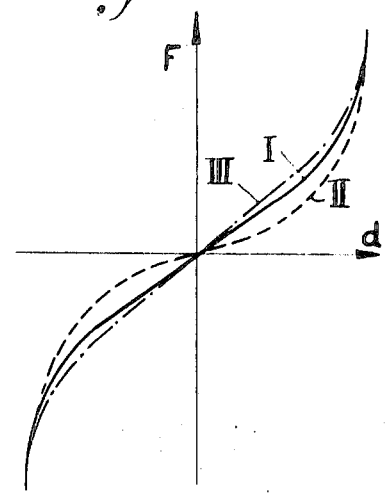
FIG. 13 is a diagram illustrating the variation in the return force exerted by the second sleeve as a function of the radial displacement of the hub.

FIG. 13 illustrates a diagram with a flexibility curve I corresponding to the curve of FIG. 7 but obtained with the sleeve 8 as shown in FIGS. 6a and 6b. The return force F is plotted in ordinates and the radial displacement d of the rear end of hub 3a is plotted in abscissa. Curve II corresponds to the flexibility variation produced by the use of a sleeve 8 as shown in FIGS. 10 and 11, and shows the flexibility increment obtained at low-amplitude beats. The last curve III corresponds on the other hand to the sleeve of FIG. 12 and shows the decrease in flexibility in the case of low-amplitude beats.

The law on which the decrease in diameter of the various beads of sleeve 8 is based could differ from that illustrated in the drawing. On the other hand, the contact surfaces of these various beads may be determined by the intersection of the frustoconical envelope with the various toroidal sections constituted by said beads.

What I claim is:

1. A wheel suspension providing a longitudinal flexibility for a wheel having its support mounted through pivot means to the end of a transverse arm provided with a hub whereby said arm is pivotally mounted about a fixed shaft disposed in vertical and longitudinal plane, and rigid with the chassis of the vehicle, said suspension comprising a first means for flexibly connecting a first end of said hub to the shaft disposed therein for substantially preventing any radial movement of the hub axis while permitting its inclination in relation to the shaft by oscillating about a center located adjacent the point of intersection of said shaft axis with the transverse plane containing the axis of the pivotal movements of said arm in relation to the wheel support, said first connecting means consisting of a first sleeve of elastomer mounted about said shaft and formed with a cylindrical outer surface having hollow cells spaced from one another and from the opposite ends of said sleeve, said cylindrical outer surface being in frictional contact with the inner surface of said first end of said hub, and a second means for flexibly connecting the second end of said hub to the shaft housed within said hub and damping out the radial movements of said second hub end in relation to said shaft, said second connecting means consisting of another sleeve of elastomer mounted about said shaft and carrying on its outer surface circular transverse projections in frictional contact with the inner surface of the second end of said hub.

2. A suspension as set forth in claim 1, comprising interposed friction rings whereby the frictional contact between said first and second sleeves and the inner surface of said hub can take place.

3. A suspension as set forth in claim 1, comprising bearing surfaces rigid with the chassis of the vehicle and intermediate friction members providing the axial setting of said arm in relation to the fixed shaft by the abutting engagement of the hub ends against said bearing surfaces.

4. A suspension as set forth in claim 3, wherein said friction members are integral parts of said first and second sleeves.

5. A suspension as set forth in claim 3, wherein the annular gap provided between said shaft and said hub is sealed by means of said friction members in constant sliding contact with said hub or interposed friction rings.

6. A suspension as set forth in claim 1, wherein said circular projections formed on said second sleeve have a contour formed with a relatively sharp angular apex.

7. A suspension as set forth in claim 1, wherein said circular projections formed on said second sleeve consist of beads having unequal outer diameters.

8. A suspension as set forth in claim 7, wherein said circular transverse projections formed on the outer periphery of said second sleeve have their outer diameters decreasing gradually in the direction away from the center of oscillation of the hub in relation to said longitudinal carrier shaft.

9. A suspension as set forth in claim 8, wherein said circular transverse projections of decreasing diameter which are carried by said second sleeve have a substantially frustoconical geometrical envelope of which the major base is nearer to the center of oscillation of the hub in said shaft than the minor base.

10. A suspension as set forth in claim 1, wherein the radii of curvature of the meridians of said circular transverse projections carried by the outer periphery of said second sleeve decrease gradually in the direction away from the center of oscillation of the hub in relation to the longitudinal carrier arm.